United States Patent [19]
Kautz et al.

[11] Patent Number: 5,259,067
[45] Date of Patent: Nov. 2, 1993

[54] OPTIMIZATION OF INFORMATION BASES

[75] Inventors: Henry A. Kautz; Bart Selman, both of Summit, N.J.

[73] Assignee: AT&T Bell Laboratories, Murray Hill, N.J.

[21] Appl. No.: 722,726

[22] Filed: Jun. 27, 1991

[51] Int. Cl.⁵ .............................................. G06F 15/18
[52] U.S. Cl. ........................................ 395/67; 395/54
[58] Field of Search ...................... 395/67, 54, 51, 61, 395/75

[56] References Cited

U.S. PATENT DOCUMENTS 4,884,218  11/1989  Agnew et al. .................. 364/513
4,908,778   3/1990  Moriyasu et al. ............... 364/513

OTHER PUBLICATIONS

Cohen, J., "Constraint Logic Programming Languages", Communications of the ACM, Jul. 1990, 52-68.
Lee et al., "Knowledge-directed Query Processing in Expert Database Systems", Proceedings Tools for Artificial Intelligence '90, Nov. 1990, 640-646.
Derschowitz et al., "Inductive Synthesis of Equatronal Programs", Proceedings Eighth National Conf. on Artificial Intelligence, Jul. 1990, 234-239.
Hamacher et al., Computer Organization, McGraw-Hill, Inc., 1984, 346-352.
Mittal et al., "Patrec: A Knowledge-Directed Database for a Diagnostic Expert System", IEEE Computer, Sep. 1984, 51-58.
Ceri et al., "What You Always Wanted to Know About Datalog(And Never Dared To Ask)" IEEE Trans. Knowledge and Data Engineering, Mar. 1989, 146-166.
Jay et al., "Expert's Toolbox: Frames in Prolog", Expert, Mar. 1989, 19-24.
Tanimoto, S. L., The Elements of Artificial Intelligence, Computer Science Press, 1987, 187-220.
Chakrovarthy et al., "Foundations of Semantic Query Optimization for Deductive Databases", Foundations of Deductive Databases and Logic Programming, 1988, 243-273.
Langley, P., "Exploring the space of cognitive architectures", Behavior Research Methods & Instrumentation, 1983, 289-299.
A. Borgida and D. W. Etherington, "Hierarchical Knowledge Bases and Efficient Disjunctive Reasoning", Proc. of the 1st Int'l. Conf. on Principles of Knowledge Representation and Reasoning, Toronto, 1989. Morgan-Kaufman Publishers.
T. Imielinski, "Abstraction in Query Processing", J. of the Assoc. for Computing Machinery, vol. 18, No. 3, Jul. 1991, pp. 534-588.

*Primary Examiner*—Michael R. Fleming
*Assistant Examiner*—Robert W. Downs
*Attorney, Agent, or Firm*—Gordon E. Nelson

[57] ABSTRACT

A technique for increasing the efficiency of a system such as an artificial intelligence system or a data base system in which a query is applied to a set of formulas. The technique creates an approximation of the set of formulas which is computationally more tractable than the original set. The original set is used to answer the query only if the approximation fails to provide the answer. The approximation is made by a compilation process which provides a series of ever-closer approximations. A given query is answered using the currently-closest approximation. The approximation may consist of a first set of formulas which is an upper bound (i.e. implied by) of the original set, and a second set which is a lower bound (i.e. implies) of the original set. In this case, the compilation process produces a series of increasing lower bounds and decreasing upper bounds until a greatest lower bound and a least upper bound are reached. Example applications of the technique are given for propositional languages, first order languages, languages based on definite clauses, and frame languages.

11 Claims, 3 Drawing Sheets

FIG. 1
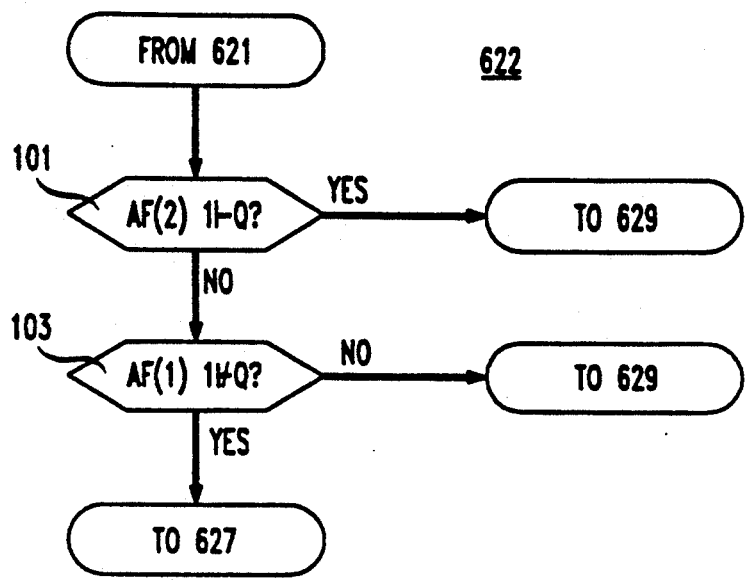
FIG. 2
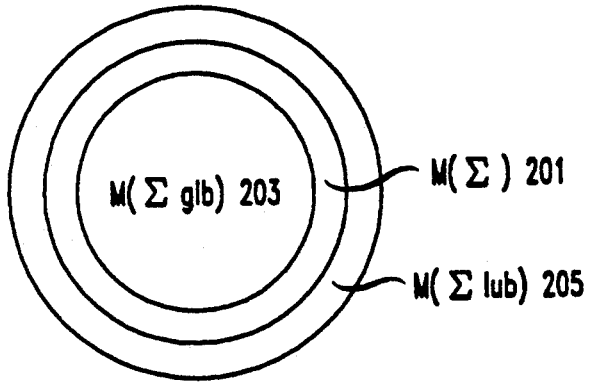
FIG. 3
```
        GLB Algorithm
        Input: a set of clauses Σ = {C₁, C₂, ..., Cₙ}.
        Output: a greatest Horn lower-bound of Σ.
    303 ⎡ begin
        ⎣    L := the lexicographically first Horn-
                 strengthening of Σ
           ⎡ loop
    305   ⎢    L' := lexicographically next Horn-
           ⎢         strengthening of Σ
           ⎢    if none exists then exit
           ⎣    if L ⊨ L' then L := L'
    301    end loop
           remove subsumed clauses from L
    307    return L
        end.
```

FIG. 4

```
401   LUB Algorithm
      Input: a set of clauses Σ = Σ_H ∪ Σ_N, where
             Σ_H is a set of Horn clauses, and Σ_N is a
             set of non-Horn clauses.
      Output: a least Horn upper-bound of Σ.
      begin
          loop
409           try to choose clause C_0 ∈ Σ_H ∪ Σ_N and
                  C_1 ∈ Σ_N, such that C_2 = Resolve(C_0, C_1)
                  is not subsumed by any clause in Σ_H ∪ Σ_N
405           if no such choice is possible then exit loop
403           if C_2 is Horn then
                  delete from Σ_H and Σ_N any clauses
                      subsumed by C_2
407               Σ_H := Σ_H ∪ {C_2}
              else
                  delete from Σ_N any clauses subsumed by C_2
                  Σ_N := Σ_N ∪ {C_2}
              end if
          end loop
          return Σ_H
      end
```

FIG. 7

701  Global Variables:
     integer $N$           initialized to the number of clauses in $\Sigma$.
     array $S[1:N]$        initialized so that $S[i]$ is a list of the
                           literals in the $i$-th clause in $\Sigma$.
     array $POS[1:N]$      initialized so that $POS[i]$ = the number of
                           positive literals in clause $S[i]$.
     array $COUNT[1:N]$    initialized to all 1's.
     array $A[1:N]$        not initialized.

Function lexicographically_next_Horn_strengthening
Output: each time called, returns the next Horn strengthening of $\Sigma$.
        When there are no more strengthenings, returns "NO MORE".
        Before first time called, global variables should be
        initialized as described above.

```
begin
    i := 1
    while i ≤ N and COUNT[i] = POS[i] do
        COUNT[i] := 1
        i := i + 1
    end while
    if i > N then return "NO MORE"
    COUNT[i] := COUNT[i] + 1
    for j = 1 to N do
        A[j] = S[j]
        delete all positive literals except for the COUNT[i]-th
            positive literal from A[j]
    end for
    return A
end.
```

OPTIMIZATION OF INFORMATION BASES

BACKGROUND OF THE INVENTION

1. Field of the Invention

The invention relates to systems such as data base systems and artificial intelligence systems in which relationships between items in an information base such as a data base or a knowledge base are expressed by means of sets of formulas. In a data base system, a formula may express a relationship between fields of different records; for example, the value of a first field may depend on the values of a set of second fields. In a knowledge base system, it may express a logical relationship between two facts in the knowledge base; an example would be that the truth of one of the facts implies the existence of the other.

2. Description of the Prior Art

An area of the prior art which makes particularly wide use of formulas is the "logicist" approach to artificial intelligence. In this type of artificial intelligence, commonsense knowledge is represented by logical formulas and the system "reasons" by doing formal theorem proving using a knowledge base of the logical formulas. For example, if the system's knowledge base indicates that a fact p is true and implies a fact q and the system is presented with a query involving the fact q, the system will infer the truth of the fact q from the knowledge base and will use that inference in answering the query. A general introduction to the knowledge bases used in such systems is Ronald J. Brachman, "The Basics of Knowledge Representation and Reasoning", *AT&T Technical Journal*, vol. 67, 1, pp. 7-24.

Knowledge bases for artificial intelligence systems employing the logicist approach are written using representation languages which represent the formulas. From the point of view of knowledge base writing, the best representation languages are unrestricted representation languages, which can directly represent any logical formula. A problem with knowledge bases using such unrestricted representation languages is that the complexity of theorem-proving with such knowledge bases is very high—exponential or worse—in both theory and practice. In artificial intelligence systems based on such knowledge bases, the complexity of theorem proving is reflected in the high cost in time and computation resources of answering a query.

One way to make the logicist approach more computationally attractive is to restrict the expressive power of the representation language, so that fast, special-purpose inference algorithms can be employed. But this usually renders the language too limited for practical application (see J. Doyle and R. Patil, "Two Theses of Knowledge Representation: Language Restrictions, Taxonomic Classification, and the Utility of Representation Services", *Artificial Intelligence* 48(3), 261-298, 1991) and leaves unanswered the question of what to do with formulas that cannot be represented in the restricted form.

As may be seen from the foregoing, there is a trade off in artificial intelligence systems which use the logicist approach between the expressive power of the language used to represent a knowledge base and the computational tractability of the system. It is an object of the invention disclosed herein to alleviate the trade off by permitting use of a general unrestricted representation language while achieving the computational efficiencies possible with restricted representation languages. It is further an object of the invention to alleviate similar trade offs in any information bases employing formulas.

SUMMARY OF THE INVENTION

The trade off is alleviated by means of apparatus for representing a set of formulas in a system of the type in which a query is applied to the set of formulas to obtain an answer. The apparatus includes a first representation of the set of formulas; and a second representation of the set of formulas which is an approximation of the first representation but is computationally more tractable than the first representation.

A query is answered using the above apparatus by obtaining the answer from an application of the query to the second representation if the query is answerable by the approximation and otherwise obtaining the answer from an application of the query to the first representation.

In a preferred embodiment, the second representation is made from the first representation by a compilation process which proceeds independently of answering the query. In the preferred embodiment, the compilation process is performed continuously until no better approximation of the first representation can be produced and the approximation used to answer the query is the current best approximation produced by the compilation process.

The foregoing and other objects and advantages of the invention will be clear to those of ordinary skill in the art after perusal of the following Drawing and Detailed Description, wherein:

BRIEF DESCRIPTION OF THE DRAWING

FIG. 1 illustrates the process of efficient query-answering in a preferred embodiment;

FIG. 2 illustrates the relationship of a set of formulas $\Sigma$ to its Horn approximations, by showing the manner in which the models of the LUB and the GLB bound the sets of models of $\Sigma$;

FIG. 3 presents the pseudo-code for the GLB algorithm;

FIG. 4 presents the pseudo-code for the LUB algorithm;

FIG. 7 presents the algorithm for choosing the lexicographically next Horn strengthening.

Reference numbers in the Figures have two parts: the two least-significant digits are reference numbers within a figure; the remaining digits are the number of the figure in which the item with the reference number first appears. Thus, the item labelled 519 first appears in FIG. 5.

DETAILED DESCRIPTION

The following Detailed Description begins with an overview of the invention and then proceeds to a detailed description of a preferred embodiment thereof.

OVERVIEW OF THE INVENTION: FIGS. 5 AND 6

Figure 5:
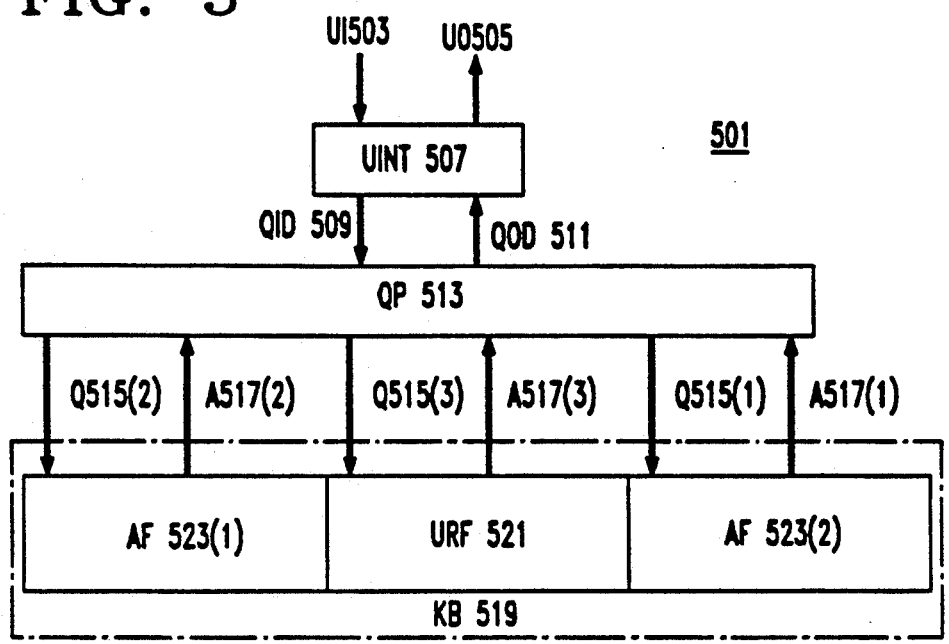
FIG. 5 presents an overview of an artificial intelligence system incorporating the present invention.

FIG. 5 shows an artificial intelligence system 501 which employs the logicist approach and which is implemented using the present invention. The major components are the following:

- User interface (UINT) 507 is the interface between the system and the user.
- Query processor (QP) 513 processes queries received via user interface 507 from the user.
- Knowledge base (KB) 519 is a set of formulas used to answer queries.

Operation of system 501 is as follows: A user of the system inputs user input 503 specifying a query to user interface 507. User interface 507 uses the user input to form query input data 509, which it supplies to query processor 513. Query processor 513 forms a query (Q) 515 from query input data 509 and applies the query to knowledge base 519. As a result of the application, an answer 517 is received in query processor 513. Query processor 513 converts answer 517 to query output data 511, which it provides to user interface 507, which in turn uses query output data 511 to produce user output 505, which indicates the result of the query to the user.

System 501 may be implemented in any computer system. Typically, user interface 507 is a program which controls a terminal and which receives UI 503 from the user at the terminal and outputs UO 505 to the terminal display; however, user interface 507 may be any source of query input data 509. Query processor 513 is typically a program which applies queries Q 515 to knowledge base 519; knowledge base 519 may be implemented in any storage system, such as memory, a file system, or a data base system.

System 501 differs from standard artificial intelligence systems which employ the logicist approach in that knowledge base 519 contains two sets of formulas. The first of these, unrestricted representation formulas (URF) 521 is a set of formulas written in a unrestricted representation language. The second set, approximation formulas (AF) 523(1) and (2) is a set of formulas which are written in a representation language which is computationally more tractable than the unrestricted representation language used for URF 521 and which are a logical approximation of URF 521. The formulas of AF 523 are a logical approximation because if they are able to answer a query 515 at all, the answer they will give will be the same as the answer which the formulas of unrestricted representation formulas 521 would have given.

Figure 6:
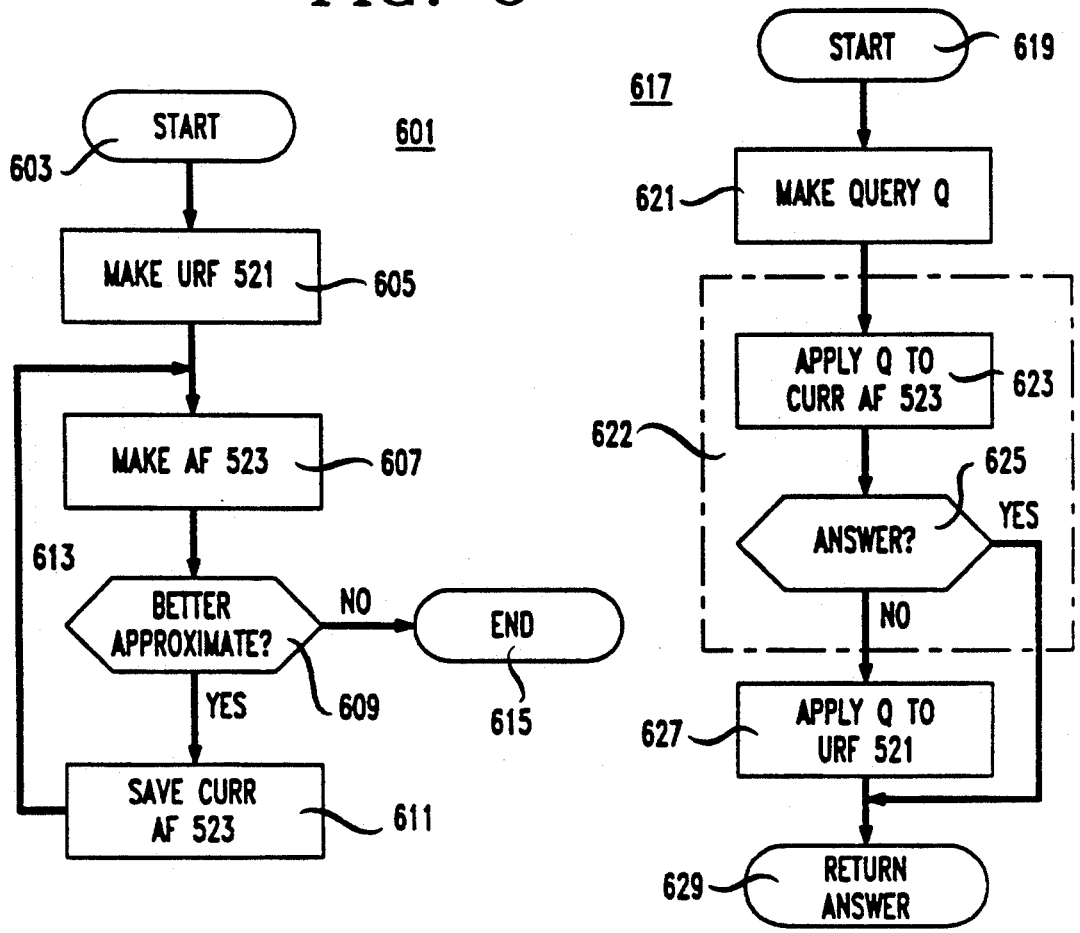
FIG. 6 presents flow charts showing operation of the present invention.

Operation of query processor 513 with URF 521 and AF 523 is given in flowchart 617 of FIG. 6. As shown there, the first step 621 is to make a query 515. Then the query is applied to AF 523 (step 623); if answer 517 can be obtained from AF 523 (step 625), it is returned (step 629); if not, the query is applied to URF 521 (step 627) and the answer 517 resulting from that application is returned. Since system 501 includes unrestricted representation formula set 521, it can answer any query which a system containing only unrestricted formula set 521 can answer; however, since it also includes approximation formula set 523, it can answer many queries much more rapidly than a system containing only unrestricted formula set 521.

The number of queries which can by answered by approximation formula set 523 depends on how closely set 523 approximates set 521. Set 523 is produced from set 521 by a knowledge compilation process which will be described in more detail below. A problem with the knowledge compilation process is that the production of a good approximation is expensive both in time and in computational resources. In a preferred embodiment, the problem is solved by making a series of compilations. Each member of the series produces a formula set 523 which is a better approximation of formula set 521 than that produced by the preceding member of the series, and when apparatus 501 answers a query, it uses the current best formula set 523, as indicated in step 623 of flowchart 617. The series of compilations terminates when the compiler can produce no better approximation of set 521.

Flowchart 601 of FIG. 6 shows how knowledge base 519 is produced. First, URF 521 is produced, generally by a knowledge engineer using a special set of software tools (605). Then the compilation series begins at 607. The first formula set 523 is produced from formula set 521. The first time through decision block 609, it is presumed that a better set 523 can be produced, so the yes branch is taken, and the first formula set 523 is saved as the current formula step 523. Then the compilation is done again to see whether a formula set 523 can be made which is better than the current formula step 523 (607). As shown in decision block 609, if the result is better, it is saved as the new current set 523; otherwise, the compilation terminates. Once the first formula set 523 has been produced, there is always a formula set 523 available for use by system 501; consequently, the knowledge compilation can be done independently of the operation of system 501. Further, the knowledge compiler can be executed by a low-priority process which runs only when no higher-priority process is running. When compilation is done in this fashion, it requires no resources which would not otherwise be wasted.

In a preferred embodiment, approximation formula set 523 has two parts, 523(1), which defines an approximation which is a lower bound of unrestricted formula set 521 and 523(2), which defines an approximation which is an upper bound of unrestricted formula set 521. In the present context, formula set 523(1) is a lower bound of formula set 521 if formula set 523(1) implies formula set 521 and formula set 523(2) is an upper bound of formula set 521 if formula set 521 implies formula set 523(2). The relationship between formula set 523(1), formula set 521, and formula set 523(2) is shown in FIG. 2, where the set of models M 203 corresponds to set 523(1), set of models M 201 corresponds to formula set 521, and the set of models M 205 corresponds to set 523(2). In the preferred embodiment, the knowledge compiler produces a series of sets 523(1), each one of which is a greater lower bound of set 521 than the preceding set 523(1), and a series of sets 523(2), each of which is a lesser upper bound of set 521 than the preceding set 523(2).

The manner in which a preferred embodiment employs set 523(1), set 523(2), and set 521 to answer a query is shown in FIGS. 1 and 6. As shown in FIG. 1, query processor 513 first applies query 515 to formula set 523(2), which represents the current least upper bound of formula set 521. If the answer to the query can be implied from formula set AF 523(2), no further inquiry is needed, and the answer is returned (block 101); if the answer cannot be implied from formula set AF 523(2), query processor 513 applies query 515 to formula set AF 523(1), which represents the current greatest lower bound of formula set 521. If the answer to the query cannot be implied from formula set AF 523(1), it cannot be implied from formula set URF 521, and query processor 513 returns an answer to that effect to the user. If the answer to the query can be implied from formula set AF 523(1), the query must be applied to formula set URF 521 (block 103).

The same mode of operation is shown by the arrows connecting query processor 513 and knowledge base 519 in FIG. 5. As indicated by the arrow 515(1), query 515 is first presented to AF 523(2); answer 517(1) is returned from AF 523(2), and if it indicates that the answer to the query cannot be implied from AF 523(2), query 515 is next presented to AF 523(2), as indicated by the reference number 515(2). Answer 512(2) indicates either that the query cannot be answered by knowledge base 515 or that it must be answered by URF 521, and as indicated by arrow 515(3), query processor 513 next presents the query to URF 521 to obtain answer 517(3).

DETAILS OF KNOWLEDGE BASE APPROXIMATION

GENERAL FRAMEWORK

This section defines a general framework for approximating a knowledge base. The next section presents a number of different instances of this general framework.

A knowledge compilation system is a tuple $(L, \models, L_S, L_T, L_Q, f_L, f_U)$ containing the following components:

L is a formal language. We identify a language with the set of all its sentences.

$\models$ is a consequence relation over sets of sentences in L. In most of the examples we will study $\models$ has its usual meaning of logical entailment, but theframework allows $\models$ to represent other relationships, such as subsumption.

$L_S$ is the "source" sublanguage of L, used to express a general knowledge base.

$L_T$ is the "target" sublanguage of L, used to express approximations to the general knowledge base. It should be easier in some sense (analytically or empirically) to determine if a query is a consequence of a set of sentences in $L_T$ than of a set sentences in $L_S$.

$f_L$ is a function mapping a theory to a (potentially infinite) sequence of (better and better) lower-bounds (see below). Ideally the last element of the sequence is the greatest lower-bound (GLB).

$f_U$ is a function mapping a theory to a (potentially infinite) sequence of (better and better) upper-bounds (see below). Ideally the last element of the sequence is the least upper-bound (LUB).

Suppose a knowledge compilation system is presented a query $\alpha \in L_Q$ after performing i compilation steps on the source theory $\Sigma$. Let $\Sigma_{lb}$ be the ith element of $f_L(\Sigma)$ (or the last element if i is greater than the length of $f_L(\Sigma)$), and $\Sigma_{ub}$ be the i-th (or similarly the last) element of $f_U(\Sigma)$. If $(\Sigma_{lb} \models \alpha)$ then the system answers "no", if $(\Sigma_{ub} \models \alpha)$ then the system answers "yes", and otherwise it answers "unknown". A definite answer of "yes" or "no" always agrees with the answer to the question "does $\Sigma \models \alpha$?", even if the lower (upper) bound is not the greatest (least) bound. FIG. 1 illustrates this process.

HORN APPROXIMATIONS

In this section, we give a concrete example of knowledge compilation. We show how a logical theory can be compiled into a tractable form consisting of a set of Horn clauses. It is well-known that in the propositional case reasoning with Horn theories is efficient. Moreover, the experience with logic programming and databases suggests that there are also computational advantages to the use of Horn clauses in the first-order case.

We first restrict our attention to the propositional case, and later, briefly consider the first-order case.

We assume a standard propositional language, and use a, b, c, p, q, and r to denote propositional letters. Intuitively, a propositional letter represents some particular fact about the world. A formula is constructed out of propositional letters and the logical connectives $\neg$, $\wedge$, $\vee$, and $\supset$. That is, a formula is either a single propositional letter; the negation of a formula; the conjunction of two formulas; the disjunction of two formulas; or two formulas connected by material implication.

Implemented knowledge compilation systems can represent formulas in a number of different ways. For example, formulas can be implemented by directed graphs, where leaf nodes represent the propositional letters, and each non-leaf node represents an instance of a connective that points to the nodes representing the formulas joined by that connective. Other implementations of formulas include strings and entries in a relational database table.

We use the letters x, y, and z to denote literals, where literal is either a propositional letter, called a positive literal, or its negation, called a negative literal. We will be mainly concerned with a special class of formulas known as clauses. A clause is a disjunction of literals, and can be represented by the set of literals it contains. (As just noted, particular knowledge compilation systems can implement clauses in various ways; for example, as sets, if set operations are available in the programming language used; as lists; as directed graphs; as strings; as entries in a relational database; and so on.) A clause is Horn if and only if it contains at most one positive literal; a set of such clauses is called a Horn theory. Formulas are given in conjunctive normal form (CNF, a conjunction of disjuncts), so they can be represented by a set of clauses. CNF notation and clausal notation are used interchangeably. For example, we may write $(p \vee \neg q) \wedge r$ instead of $\{\{p, \neg q\}, \{r\}\}$, and vice versa.

Where $\Sigma$ is a set of formulas and $\alpha$ is a formula, we write $\Sigma \models \alpha$ (equivalently $\Sigma$ entails $\alpha$) when $\alpha$ follows from $\Sigma$ by the rules of logical deduction. When $\Sigma$ consists of a single formula we may write that formula rather than the singleton set containing that formula. Finally, where $\Sigma'$ is a set of formulas, we write $\Sigma \models \Sigma'$ to mean that $\Sigma \models \alpha$ for every formula $\alpha$ in the set $\Sigma'$.

In general, determining whether a given CNF formula (the query) follows from a set of formulas in a knowledge base is intractable (see S. A. Cook, "The Complexity of Theorem-proving Procedures" in: *Proceedings of the 3rd Annual ACM Symposium on the Theory of Computing*, pp. 151-158, 1971) However, when the knowledge base contains only Horn clauses the problem can be solved in time linear in the length of the knowledge base combined with the query (see Dowling and Gallier, "Linear Time Algorithms for Testing the Satisfiability of Propositional Horn Formula, *Journal of Logic Programming*, 3:267-284, 1984)

So, a useful kind of knowledge compilation would be the following: Given a set of arbitrary clauses, compute a logically equivalent set of Horn clauses, and base subsequent inference on that set. Unfortunately, there does not always exist a logically equivalent Horn theory: for example, no Horn theory is equivalent to the theory $p \vee q$. We therefore propose to approximate the original set of clauses by a set of Horn clauses. The basic idea is to bound the set of models (satisfying truth assignments) of the original theory from below and from above by Horn theories. In the following definition, $M(\Sigma)$ denotes the set of satisfying truth assignments of the theory $\Sigma$.

Definition: Horn lower-bound and Horn upper-bound

Let $\Sigma$ be a set of clauses. The sets $\Sigma_{lb}$ and $\Sigma_{ub}$ of Horn clauses are respectively a Horn lower-bound and a Horn upper-bound of $\Sigma$ iff $$M(\Sigma_{lb}) \subseteq M(\Sigma) \subseteq M(\Sigma_{ub})$$

or, equivalently, $$\Sigma_{lb} \models \Sigma \models \Sigma_{ub}$$

Note that the bounds are defined in terms of models: the lower bounds have fewer models than the original theory, and the upper bound has more models. The reader is cautioned not to associate "lower" with "logically weaker." In fact, because the lower bound has fewer models, it is logically stronger than (i.e., entails) the original theory. Similarly, because the upper bound has more models, it is logically weaker than (i.e., is implied by) the original theory.

Instead of simply using any pair of bounds to characterize the initial theory, we wish to use the best possible ones: a greatest Horn lower-bound and a least Horn upper-bound.

Definition: Greatest Horn lower-bound (GLB)

Let $\Sigma$ be a set of clauses. The set $\Sigma_{glb}$ of Horn clauses is a greatest Horn lower-bound of $\Sigma$ iff $M(\Sigma_{glb}) \subseteq M(\Sigma)$ and there is no set $\Sigma'$ of Horn clauses such that $M(\Sigma_{glb}) \subseteq M(\Sigma') \subseteq M(\Sigma)$.

Definition: Least Horn upper-bound (LUB)

Let $\Sigma$ be a set of clauses. FIG. 2 shows the set 201, its greatest lower bound 203, and its least upper bound 205. The set $\Sigma_{lub}$ of Horn clauses is a least Horn upper-bound of $\Sigma$ iff $M(\Sigma) \subseteq M(\Sigma_{lub})$ and there is no set $\Sigma'$ of Horn clauses such that $M(\Sigma) \subseteq M(\Sigma') \subseteq M(\Sigma_{lub})$.

We call these bounds Horn approximations of the original theory $\Sigma$. The definition of Horn upper-bound implies that the conjunction of two such bounds is another, possibly smaller upper-bound. It follows that a given theory has a unique LUB (up to logical equivalence). On the other hand, a theory can have many different GLBs.

Example

Consider the non-Horn theory $\Sigma = (\neg a \vee c) \wedge (\neg b \vee c) \wedge (a \vee b)$. The Horn theory $a \wedge b \wedge c$ is an example of a Horn lower-bound; both $a \wedge c$ and $b \wedge c$ are GLBs; $(\neg a \vee c) \wedge (\neg b \vee c)$ is an example of a Horn upper-bound; and c is the LUB. The reader can verify these bounds by noting that $$(a \wedge b \wedge c) \models (a \wedge c) \models \Sigma \models c \models ((\neg a \vee c) \wedge (\neg b \vee c))$$

Moreover, there is no Horn theory $\Sigma'$ different from $a \wedge c$ such that $(a \wedge c) \models \Sigma' \models \Sigma$. Similar properties hold of the other GLB and of the LUB.

Before we discuss how to compute Horn approximations, let us consider how these approximations can be used to improve the efficiency of a knowledge representation system. Suppose a knowledge base (KB) contains the set of clauses $\Sigma$, and we want to determine whether the formula $\alpha$ is implied by the KB. We assume that $\alpha$ is in CNF but is not necessarily Horn. The system can proceed as follows.

First, the system tries to obtain an answer quickly by using the Horn approximations. If $\Sigma_{lub} \models \alpha$ then it returns "yes," or if $\Sigma_{glb} \not\models \alpha$ then it returns "no." The tests to determine if $\Sigma_{lub} \models \alpha$ and $\Sigma_{glb} \not\models \alpha$ and be efficiently implemented using the algorithm for determining satisfiability of a set of Horn clauses developed by Dowling and Gallier, supra. In particular, $\Sigma_{lub} \models \alpha$ is true if and only if the set of Horn clauses $\Sigma_{lub} \cup \{\neg C | C \epsilon \alpha\}$ is unsatisfiable. Similarly, $\Sigma_{glb} \not\models \alpha$ is true if and only if the set of Horn clauses $\Sigma_{glb} \cup \{\neg C | C \epsilon \alpha\}$ is satisfiable. Because the Dowling and Gallier algorithm runs in time linear in the length of the set of Horn clauses, this procedure takes only time linear in the length of the approximations plus the length of the query.

In case no answer is obtained, the system could simply return "don't know," or it could decide to spend more time and use a general inference procedure to determine the answer directly from the original theory. The general inference procedure could still use the approximations to prune its search space. Thus the system can answer certain queries in linear time, resulting in a improvement in its overall response time. Exactly how many queries can be handled directly by the Horn approximations depends on how well the bounds characterize the original theory. Note that we give up neither soundness nor completeness, because we can always fall back to the original theory.

COMPUTING HORN APPROXIMATIONS

We now turn to the problem of generating Horn approximations. There cannot be a polynomial time procedure for generating such approximations (provided P$\neq$NP). This problem may be dealt with by viewing the computation of the Horn approximations as a compilation process. The computational cost can be amortized over the total set of subsequent queries to the KB. In some cases, however, the approximations may be needed for query answering before the compilation process finishes. So, instead of waiting for the best Horn bounds, it would be desirable to employ procedures that could output lower- and upper-bounds as intermediate results, generating better and better bounds over time. Such procedures are termed "anytime" procedures. The approximation algorithms presented in this paper can be implemented as anytime procedures. We discuss a method for generating the GLB first. The following notion is central to our approach:

Definition: Horn-strengthening

A Horn clause $C_H$ is a Horn-strengthening of a clause C iff $C_H \subseteq C$ and there is no Horn clause $C'_H$ such that $C_H \subseteq C'_H \subseteq C$.

Example

Consider the clause $C = \{p, q, \neg r\}$. The clauses $\{p, \neg r\}$ and $\{q, \neg r\}$ are Horn-strengthenings of C.

The following two theorems state some useful properties of Horn-strengthenings. The first theorem shows that a Horn theory entails a clause only if it entails some Horn-strengthening of the clause.

Theorem 1

Let $\Sigma_H$ be a Horn theory and C a clause that is not a tautology. If $\Sigma_H \models C$ then there is a clause $C_H$ that is a Horn-strengthening of C such that $\Sigma_H \models C_H$.

Proof

By the subsumption theorem (see R. C. T. Lee, *A Completeness Theorem and a Computer Program for Finding Theorems Derivable from Given Axioms*, Ph.D thesis, University of California at Berkeley, Berkeley, Calif. 1967), there is a clause C' that follows from $\Sigma_H$ by resolution such that C' subsumes C. Because the resolvent of Horn clauses is Horn, C' is Horn, and thus is a Horn-strengthening of C.

The next theorem shows that every GLB of a theory—given in clausal form—is equivalent to some subset of the Horn-strengthenings of the clauses of the theory.

Theorem 2

If $\Sigma_{glb}$ is a GLB of a theory $\Sigma = \{C_1, \ldots, C_n\}$, then there is a set of clauses $C'_1, \ldots, C'_n$ such that $\Sigma_{glb} = \{C'_1, \ldots, C'_n\}$, where $C'_i$ is a Horn-strengthening of $C_i$.

So, each GLB of $\Sigma$ is given by some Horn-strengthening of the clauses of $\Sigma$. Moreover, it is not difficult to see that the set containing a Horn-strengthening of each clause is a Horn lower-bound of $\Sigma$—though not necessarily the greatest lower-bound. This leads us to the GLB algorithm given in FIG. 3. The algorithm systematically searches through the various possible Horn-strengthenings of the clauses of the original theory, looking for a most general one. The algorithm for providing the Horn-strengthenings is shown in FIG. 7. Where $\Sigma = \{C_1, C_2, \ldots, C_n\}$ and $C_i^j$ is the j-th Horn strengthening of clause $C_i$, the Horn strengthenings of $\Sigma$ are generated in the lexicographic order $\{C_1^1, C_2^1, \ldots, C_n^1\}, \{C_1^2, C_2^1, \ldots, C_n^1\}, \{C_1^1, C_2^2, \ldots, C_n^1\}, \{C_1^2, C_2^2, \ldots, C_n^1\}$, etc.

Theorem 3

Given a set of clauses $\Sigma$, the GLB algorithm (FIG. 3) computes a greatest Horn lower-bound of $\Sigma$ of length less than or equal to that of $\Sigma$.

EXAMPLE

Consider the theory $\Sigma = (\neg a \vee b \vee c) \wedge (a \vee b)$. The algorithm first tries the Horn-strengthening $L = ((\neg a \vee b) \wedge a) \equiv (a \wedge b)$, (303 in FIG. 3) and then $L' = ((\neg a \vee b) \wedge b) \equiv b$. Since $L \models L'$, L is set to L', and the algorithm proceeds. Since the other two Horn strengthenings do not further improve the bound, the algorithm returns b as an answer (305) (the redundant clause ($\neg a \vee b$) is removed by the last step of the algorithm (307)).

Proof of correctness of the GLB algorithm

Assume that the set of clauses L returned by the algorithm is not a GLB of $\Sigma$. Clearly, L is a Horn lower-bound. So, it follows that there is some greatest Horn lower-bound L' of $\Sigma$ such that $L \models L' \models \Sigma$ and $L' \not\models L$. By Theorem 2, L' is equivalent to some Horn-strengthening L* of the clauses of $\Sigma$. So, the algorithm would have returned L*. Contradiction.

The GLB algorithm is indeed an anytime algorithm: L represents some lower-bound whenever the algorithm is interrupted. Note also that the total running time of the algorithm is exponential only in the length of the non-Horn part of the original theory, because the only strengthening of a Horn clause is the clause itself.

A theory may have exponentially many greatest Horn lower-bounds, so in practice one would not want to generate them all. However, there is a simple and significant relationship between a theory and the set of all its GLBs, which follows from the fact that each model of a theory is a lower-bound of the theory:

Theorem 4

Let $\Sigma$ be a set of clauses. Then $\Sigma$ is logically equivalent to the disjunction of all the greatest Horn lower-bounds of $\Sigma$.

We now turn our attention to the generation of the LUB. We will use the notion of a prime implicate of a theory, which is a strongest clause entailed by the theory. The following theorem reveals our basic strategy.

Theorem 5

Let $\Sigma$ be a set of clauses. The LUB of $\Sigma$ is logically equivalent to the set of all Horn prime implicates of $\Sigma$.

Proof

The set of Horn prime implicates is entailed by $\Sigma$, and thus is a Horn upper-bound. Furthermore, it must be the LUB, because at least one of its clauses subsumes (and therefore entails) any clause in any Horn upper-bound.

So, in principle, we could use resolution to generate the prime implicates and simply collect the Horn ones in order to generate the least Horn upper-bound. However, such a method could prove very expensive since even if the original theory contains only Horn clauses, there can be exponentially many Horn resolvents. Clearly, such resolvents add nothing to the best approximation of the original Horn theory, since the least Horn upper-bound is already given by the theory itself. Fortunately, we can improve upon the procedure of generating all prime implicates by only resolving two clauses if at least one of them is non-Horn.

Theorem 6

Given a set of clauses $\Sigma$, the LUB algorithm (FIG. 4) computes the least Horn upper-bound of $\Sigma$. The operations of subsumption and resolution required by the algorithm are well-known in the art and are described in Chapter 5 of Nils J. Nilsson, *Principles of Artificial Intelligence*, Tioga Publishing Co., 1980.

Example

Consider the theory $(\neg a \vee c) \wedge (\neg b \vee c) \wedge (a \vee b)$. The LUB algorithm initializes $\Sigma_H$ to $\{\neg a \vee c, \neg b \vee c\}$, and initializes $\Sigma_N$ to $\{a \vee b\}$. It then resolves $\neg a \vee c$ with $a \vee b$, yielding the non-Horn clause $b \vee c$, which is added to $\Sigma_N$. Next it resolves $\neg b \vee c$ with $a \vee b$, yielding $a \vee c$, which is also added to $\Sigma_N$. At this point $\Sigma_N$ contains $\{a \vee b, b \vee c, a \vee c\}$. Nothing more resolves against the first clause in $\Sigma_N$, so the algorithm resolves $b \vee c$ and $\neg b \vee c$, yielding c, which is Horn (step 409 of FIG. 4). Therefore the algorithm deletes the clauses from $\Sigma_H$ and $\Sigma_N$ that are subsumed by c (step 407). Thus $\Sigma_H$ becomes the empty set and $\Sigma_N$ becomes $\{a \vee b\}$. Then c is added to $\Sigma_H$, which becomes $\{c\}$. No more resolutions can be performed, so the algorithm halts (step 405), returning $\{c\}$.

The correctness proof of the LUB algorithm is quite involved and we therefore do not include it here. As with the GLB, the algorithm is anytime: $\Sigma_H$ improves over time.

Finally, we briefly consider the size of the generated Horn approximations. From the GLB algorithm it follows immediately that the size of the generated bound is less than or equal to that of the original theory. So, the system can safely use this bound; even if the approximation does not provide an answer for a particular query, at most a linear amount of time in terms of the length of the original theory is being "wasted." Whether there always exists a similarly short least Horn upper-bound is currently an open question. We conjecture that there are cases where the LUB algorithm generates a bound that is exponentially longer then the original theory, although we expect the blow-up to be exponential only in the size of the non-Horn part of the theory. In such cases, the system has to somehow limit the length of the approximation, for example, by using a weaker bound or by minimizing the length of the bound (e.g., replace $(a \vee \neg b) \wedge b$ by $a \wedge b$).

OTHER INSTANCES OF KNOWLEDGE COMPILATION

Restricted Clausal Forms

An entire class of knowledge compilation systems can be realized by generalizing the algorithms for the propositional Horn case. The idea of a Horn-strengthening is generalized as follows:

Definition: $\theta$-strengthening

Let $\theta$ be a particular set of clauses. A clause in that set is called a $\theta$-clause. A clause $C_T$ is a $\theta$-strengthening of a clause $C$ iff $C_T \subseteq C$ and there is no $\theta$-clause $C'_T$ such that $C_T \subseteq C'_T \subseteq C$. A $\theta$-strengthening of a set of clauses is a set of $\theta$-strengthenings of each clause.

A knowledge compilation system is created by letting the source language $L_S$ be the set of arbitrary clauses, and the target language $L_T$ be such a clause set $\theta$. Suppose such a $\theta$ is closed under resolution (i.e., the resolvents of two $\theta$-clauses is a $\theta$-clause). Then the completeness theorem for resolution, Lee, supra, tells us that any (non-tautologous) clause $C$ entailed by a set of $\theta$-clauses $\Sigma$ must be subsumed by a clause $C'$ which has a resolution proof from $\Sigma$; and therefore $C'$ is a $\theta$-clause itself. In other words, $\Sigma$ entails a $\theta$-strengthening of $C$. Further suppose that any clause in the source language has a $\theta$-strengthening. Then the GLB in terms of $\theta$-clauses of a theory $\Sigma$ can be computed by searching for a (local) maximum in the space of $\theta$-strengthenings of $\Sigma$. This proves the following theorem:

Theorem 7

Let $\Sigma$ be any set of clauses and $\theta$ a set of clauses such that (i) the resolvant of any two clauses in $\theta$ is also in $\theta$, and (ii) any clause in $\Sigma$ is subsumed by some clause in $\theta$. Then $\Sigma_{glb}$ is a greatest lower-bound in terms of $\theta$-clauses iff $\Sigma_{glb}$ is equivalent to a $\theta$-strengthening of $\Sigma$, and there is no $\theta$-strengthening $\Sigma'_{glb}$ such that $\Sigma_{glb} \models \Sigma'_{glb}$ and $\Sigma'_{glb} \not\models \Sigma_{glb}$.

Horn, reverse Horn (clauses containing at most one negative literal), and clauses containing two or fewer literals are examples of tractable classes of propositional clauses that meet the conditions of this theorem.

Recall that the Horn LUB of a theory is equivalent to the set of all its Horn resolvants. This is due to the resolution completeness theorem and the fact that propositional Horn clauses are closed under subsumption. The latter condition is necessary because one could otherwise imagine cases where resolution only yielded non-Horn clauses which subsumed the entailed Horn clauses. Thus the generalized computation of the Horn LUB is based on the following theorem:

Theorem 8

Let $\Sigma$ be any set of clauses and $\theta$ a set of clauses such that if $C \in \theta$ and $C'$ subsumes $C$, then $C' \in \theta$. Then $\Sigma_{lub}$ is the least upper-bound in terms of $\theta$-clauses of $\Sigma$ iff $\Sigma_{lub}$ is equivalent to the set of $\theta$ resolvants of $\Sigma$.

As we noted before, it is not actually necessary to compute all the $\theta$ resolvants of $\Sigma$, but only a subset logically equivalent to the entire set, as in the Horn case. All of the classes of restricted clauses mentioned above meet the condition of being closed under subsumption. Another interesting class which satisfies theorems 7 and 8 consists of clauses not containing a given set of propositional letters. (The $\theta$-strengthening of the clause p, where p is a prohibited letter, is the empty clause—that is, false.) While such a class may not have better worst-case complexity than the unrestricted language, it may be empirically desirable to "compile away" certain propositions. Subramanian and Genesereth, "The Relevance of Irrelevance", in: *Proceedings of IJCAI-87*, vol. 1, p. 416, 1987 presents a formal system for inferring that certain propositions are irrelevant to the computation of a given class of queries. Given this sense of what is irrelevant, knowledge compilation can then be used as a way to remove the irrelevant information and simplify the theory.

The class of clauses not containing a given set of letters has the following special property, which follows from Craig's Interpolation Lemma (W. Craig, "Three Uses of the Herbrand-Gentzen Theorem in Relating Model Theory and Proof Theory", *Journal of Symbolic Logic*, 22, 1955): The LUB is just as good as the original theory for answering queries not containing the prohibited letters. Formally:

Theorem 9

Let $\Sigma$ be a set of clauses and both $\theta$ and $L_Q$ sets of clauses not containing a given set of propositional letters. Suppose $\alpha \in L_Q$, and $\Sigma_{lub}$ is the least upper-bound in terms of $\theta$-clauses of $\Sigma$. Then $\Sigma \models \alpha$ iff $\Sigma_{lub} \models \alpha$.

Example

Let the set of propositions be instantiations of the two-place predicates F and R over a given set of individuals {a,b,c}. We interpret F as meaning "father of", and R as meaning "related to". The following axiom schema capture the usual relationship between these predicates, where the variables x, y, and z are instantiated over the given set of individuals:

$F(x,y) \supset R(x,y)$
$R(x,y) \wedge R(y,z) \supset R(x,z)$
$R(x,y) \supset R(y,x)$ Suppose $\Sigma$ consists of these axioms together with a set of facts about specific father-of relationships: {F(a,b),F(b,c) ∨ F(a,c)}. If it were known that queries would concern only the related-to predicate, it would be useful to compute the LUB that prohibits the letter F. This yields a theory (equivalent to) the last two axiom schema (transitivity and reflexivity) together with the the facts {R(a,b),R(b,c)}.

First-Order Theories

A further natural extension of restricted clausal forms is to first-order languages. In the first-order case, the worst-case complexity of the general and restricted languages are the same. For example, satisfiability for first-order clauses and first-order Horn clauses is equally undecidable. (A first-order clause is a sentence in prenex form containing only universal quantifiers, whose matrix is a disjunction of (first-order) literals. A first-order Horn clause is a first-order clause containing at most one positive literal.) None the less, the restricted language may have better average-case complexity for a particular domain. In this section we will examine the issues that arise in a straightforward extension of restricted clausal knowledge compilation systems to the first-order case.

We have seen how the greatest-lower bound of a theory $\Sigma$ can be computed by searching through the space of $L_T$-strengthenings of $\Sigma$. In order to decide if a candidate strengthening $\Sigma'_{lb}$ is a better lower-bound than the current strengthening $\Sigma_{lb}$, the algorithm must check if $\Sigma_{lb} \models \Sigma'_{lb}$. In the first-order case this test is not recursive, so the simple search procedure could become "stuck" at $\Sigma_{lb}$, even if it is not the greatest lower-bound.

Fortunately, it is not difficult to avoid this problem. The computation steps to determine $\Sigma_{lb} \models \Sigma'_{lb}$ should be interleaved with the generation and test of the lexicographically next candidate $L_T$-strengthening $\Sigma''_{lb}$. If the test $\Sigma_{lb} \models \Sigma''_{lb}$ returns "true", the computation for $\Sigma_{lb} \models \Sigma'_{lb}$ can be abandoned. Similarly the computation for $\Sigma_{lb} \models \Sigma''_{lb}$ can be interleaved with the generation and test of the following candidate strengthening, and so forth. With this modification the generalized GLB algorithm is correct for any knowledge compilation system where $L_S$ consists of first-order clauses, and $L_T$ is a class of first-order clauses which satisfies the conditions of Theorem 7.

The basic LUB algorithm need not be modified for first-order target languages that are closed under subsumption. Theorems 7 and 8 thus hold true for first-order as well as for propositional clauses, where "propositional letter" is understood to mean "predicate". While the classes based on restricting the length of the clauses (or the predicates contained in the clauses) are close, the first-order Horn and reverse Horn classes are not. For example, the non-Horn clause $\forall x,y.P(x,b) \lor P(a,y)$ properly subsumes the Horn clause $P(a,b)$. Therefore the LUB in the first-order Horn case must also incorporate Horn clauses that are subsumed by non-Horn resolvants, as stated in the following theorem.

Theorem 10

A set of first-order clauses $\Sigma_{lub}$ is the least Horn upper-bound of a set of first-order clauses $\Sigma$ iff $\Sigma_{lub}$ is equivalent to the set of Horn clauses subsumed by resolvants of $\Sigma$. Similar conditions apply to the reverse Horn case. Finally, we note that the query language $L_Q$ should be such that the negation of a query falls in $L_T$. Thus, in general, the queries will be existentially-quantified sentences whose matrix is a subset of DNF. For example, in the Horn case, each disjunct contains at most one negative literal; in the binary clause case, each disjunct contains at most two literals; and so on.

Definite Clauses and Logic Programs

A definite clause is a clause containing exactly one positive literal. Languages based on definite clauses can be efficiently implemented and have found widespread practical applications. For example, function-free first-order definite clauses form the basis of the database language "datalog", and general first-order difinite clauses form the basis of the programming language Prolog. (In both cases, non-logical operators such as "cut" and "failure to prove" extend the logical basis.)

It is not possible, in general, to find a definite clause lower-bound of a general theory. For example, there is no definite clause lower-bound for the theory $\{\neg p\}$.

Least upper-bounds do exist, as they do for any source and target languages—because the empty set is a trivial upper-bound, and the least upper-bound is equivalent to the union of all upper-bounds. However, definite clauses are not closed under subsumption; for example, the non-definite clause $\neg p$ subsumes the definite clause $\neg p \lor q$. Therefore the original LUB algorithm is not sufficient. A version of Theorem 2 does hold, where "Horn" is replaced by "definite clause", and can be used as the basis for an algorithm (for both the propositional and first-order cases). For example, the definite clause LUB of $\{\neg p\}$ is the set of all (binary) definite clauses subsumed by $\neg p$, i.e., $\{\neg p \lor q, \neg p \lor r, \neg p \lor s, \ldots\}$. In effect, $\neg p$ is approximated by "p implies anything," since the LUB is equivalent to $\{p \supset q, p \supset r, p \supset s, \ldots\}$.

Both lower and upper bounds do exist when the source language as well as the target language consists of definite clauses. Some recent research on the analysis of Prolog programs (for use in, for example, optimization and program specification) can be viewed as a kind of knowledge compilation. For example, Nevin Heintze and Joxan Jaffar, "A Finite Presentation Theorem for Approximating Logic Programs", in: Proceedings of POPL-90, p. 197, 1990, describes how to construct a recursive (i.e., decidable) approximation to a potentially non-recursive logic program. Their method is based on modifying each predicate by relaxing the relationship between the arguments to the predicate. For example, if a logic program computes (entails) $\{P(a,b) \land P(c,d)\}$, the approximation computes (entails) $\{P(a,b) \land P(c,d) \land P(a,d) \land P(c,b)\}$. Thus their method computes a lower-bound of the theory (but not in general the greatest lower-bound).

Terminological Reasoning

We now consider frame-based knowledge representation languages as studied in Hector J. Levesque and R. J. Brachman, "A Fundamental Tradeoff in Knowledge Representation and Reasoning (revised version)" in: Brachman and Levesque, ed., *Readings in Knowledge Representation*, pp. 41–70, Morgan Kaufmann, Los Altos, Calif. 2985, and Peter Patel-Schneider, et al., "Term Subsumption Languagers in Knowledge Representation, *AI Magazine*, 11(2):16–23, 1990. Levesque and Brachman consider a language FL in which one can describe structured concepts in terms of other concepts, either complex or primitive. For example, if we wished to describe people whose male friends are all doctors with some specialty, we could use the concept:

(person with every male friend is a (doctor with a specialty))

This concept is captured in FL by
(AND person
  (ALL (RESTR friend male)
    (AND doctor
      (SOME specialty)))), which contains all the constructs (the capitalized terms) used in the language. Levesque and Brachman consider the complexity of determining whether one concept subsumes another. For example, the concept
(person with every male friend is a doctor)
subsumes the one given above. Note that this can be determined without really knowing anything about the various concepts used in these descriptions. Now, their central technical result is that determining subsumption in FL is intractable, but that removing the RESTR construct leads to polynomial time computable subsumption. The restricted language is called $FL^-$.

So for efficient subsumption, one can use the language $FL^-$. But this language may not be sufficiently expressive for practical applications. Knowledge compilation provides again an alternative. In this case the idea is to take a concept description in the language FL and to approximate it using two concept descriptions in $FL^-$: a best lower-bound, i.e., the most general more specific concept in $FL^-$, and a best upper-bound, i.e., the most specific more general (subsuming) concept in $FL^-$.

As an example consider the first concept given above. It is not difficult to see that the concepts "person" and
(AND person
    (ALL friend
        (AND doctor
            (SOME specialty))))
in $FL^-$ are examples of, respectively, an upper-bound and a lower-bound in $FL^-$. (These are also the best bounds in this case.) The system can store such bounds with the original concept description, and use them to try to determine quickly whether the newly given concept subsumes it or is subsumed by it.

More formally, we are dealing with the knowledge compilation system $(FL, \to, FL, FL, ^-, FL, f_L, f_U)$, in which $\to$ stands for "is subsumed by."

So far, we have treated our knowledge base as containing only a single concept description. In general, a knowledge base will of course contain a hierarchy of concepts (see R. Brachman, et al., "Living with Classic: When and How to Use a KL-one-like Language", in: J. Sowa, ed., *Formal Aspects of Semantic Networks*, Morgan Kaufmann, 1990). In that case, we simply store bounds with each concept. When given a concept, the system can use those bounds in determining the appropriate place of the new concept in the hierarchy.

Conclusion

The foregoing Detailed Description has disclosed to those skilled in the arts to which the invention pertains how one may make and use an information base which contains a first set of formulas expressed in a first language and an approximation of the first set of the formulas expressed in a second language which is computationally more tractable than the first language. Other techniques than those disclosed herein for practising the invention and other areas in which the invention may be applied will be apparent to those skilled in the arts concerned after reading the foregoing disclosure. The Detailed Description is therefore to be considered in all respects as exemplary and descriptive, and not restrictive, and the scope of the invention is to be determined solely from the attached claims as read in light of the Specification and interpreted according to the doctrine of equivalences.

What is claimed is:

1. In a system in which a query is applied to a set of formulas to obtain an answer, a method of answering the query comprising the steps of:
    making a first representation of the set of formulas;
    making a second representation of the set of formulas which is an approximation of the first representation but is computationally more tractable than the first representation; and
    obtaining the answer from an application of the query to the second representation if the query is answerable by the approximation and otherwise obtaining the answer from an application of the query to the first representation.

2. The method set forth in claim 1 wherein:
    the step of making the second representation is performed asynchronously with the other steps.

3. The method set forth in claim 2 wherein:
    the step of making the second representation is performed repeatedly, each repetition producing a better approximation of the first representation.

4. The method set forth in claim 3 wherein:
    the step of obtaining the answer is performed using the most recent better approximation produced by the step of making the second representation.

5. The method set forth in claim 3 wherein:
    the step of making the second representation is performed until no better approximation can be produced.

6. The method set forth in any of claims 1 through 5 wherein:
    the step of making the first representation makes a set of clauses of a propositional language; and
    the step of making the second representation makes a set of clauses belonging to a tractable class of propositional clauses.

7. The method set forth in claim 6 wherein:
    the step of making the second representation makes a set of clauses which are Horn clauses.

8. The method set forth in claim 6 wherein:
    the step of making the second representation makes a set of clauses which belong to a first-order language.

9. The method set forth in claim 6 wherein:
    the step of making the second representation makes a set of clauses which belong to a language based on definite clauses.

10. The method set forth in any of claims 1 through 5 wherein:
    the step of making the first representation makes the representation using a frame language; and
    the step of making the second representation makes the representation using a tractable subset of the frame language.

11. Query answering apparatus comprising:
    A first representation of a set of formulas;
    a second representation of the set of formulas which is an approximation of the first representation but is computationally more tractable than the first representation; and
    means for receiving the query, applying the query to the first and second representations, and obtaining the answer from the application to the second representation if the query is answerable by the approximation and otherwise obtaining the answer from the application to the first representation.

* * * * *